(12) United States Patent
Raj et al.

(10) Patent No.: US 7,050,969 B2
(45) Date of Patent: May 23, 2006

(54) DISTRIBUTED SPEECH RECOGNITION WITH CODEC PARAMETERS

(75) Inventors: Bhiksha Raj, Watertown, MA (US); Joshua Midgal, Brockton, MA (US); Rita Singh, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 534 days.

(21) Appl. No.: 09/995,179

(22) Filed: Nov. 27, 2001

(65) Prior Publication Data

US 2003/0101051 A1    May 29, 2003

(51) Int. Cl.
*G10L 19/04*    (2006.01)
(52) U.S. Cl. ............ 704/219; 704/262; 704/243
(58) Field of Classification Search .......... 704/221, 704/222, 253, 219, 255, 214, 243, 226, 236, 704/223
See application file for complete search history.

(56) References Cited

U.S. PATENT DOCUMENTS

| | | | | |
|---|---|---|---|---|
| 6,003,004 A | * | 12/1999 | Hershkovits et al. | 704/253 |
| 6,108,624 A | * | 8/2000 | Park | 704/221 |
| 6,343,267 B1 | * | 1/2002 | Kuhn et al. | 704/222 |
| 6,691,082 B1 | * | 2/2004 | Aguilar et al. | 704/219 |
| 6,792,405 B1 | * | 9/2004 | Cox et al. | 704/236 |

* cited by examiner

*Primary Examiner*—W. R. Young
*Assistant Examiner*—Huyen X. Vo
(74) *Attorney, Agent, or Firm*—Dirk Brinkman; Andrew J. Curtin

(57) ABSTRACT

A method extracts speech recognition features from a speech signal coded as a bitstream. First, the bitstream is decoded to recover linear predictive coding filter parameters, and a residual signal. Then, the linear predictive coding filter parameters and the residual signal are discriminatively combined into speech recognition features.

11 Claims, 3 Drawing Sheets

DISTRIBUTED SPEECH RECOGNITION WITH CODEC PARAMETERS

FIELD OF THE INVENTION

The invention relates generally to the field of speech recognition, and more particularly to recognizing speech from parameters produced by a speech encoder.

BACKGROUND OF THE INVENTION

Cellular telephones and personal digital assistants (PDAs) have lately become very popular and are used for multiple tasks, which sometimes require complex and involved instructions. Often, it is inconvenient and inefficient to enter complex command sequences in these small transmitters. In this respect, speech is a convenient and natural interface with such devices. However, the small size of these transmitters limits the complexity of speech recognition tasks that they can handle, because more complex tasks typically involve more complex grammars, larger vocabularies, parsing mechanisms, and the like. Therefore, it is more practical and efficient to perform the speech recognition elsewhere, perhaps in a remote receiver.

Currently, standard coding techniques are used to encode acoustic signals transmitted over wireless networks using a codec. Typically, this is accomplished by coding short-term components of the input signal using some filtering technique that produces filter parameters which are then transmitted instead of the raw acoustic signal. In most cases, the filter is optimized for speech. Long-term components are transmitted as some residual signal derived typically by linear predictive coding (LPC). LPC is based on the premise that sampled values of a speech signal (x(n)) can be approximated as a linear combination of the past (p) speech samples, see Makhoul, "Linear prediction: A tutorial review," Proceedings of the IEEE, 63(4):561–580, 1975, and U.S. Pat. No. 6,311,153, "Speech recognition method and apparatus using frequency warping of linear prediction coefficients," issued to Nakatoh et al. on Oct. 30, 2001.

The acoustic signal can then be reconstructed and recognized from the transmitted parameters and residual signal in the receiver. However, it is well known that speech that has undergone coding and reconstruction has lower recognition accuracies than uncoded speech, see Lilly, B. T., and Paliwal, K. K., (1996) "Effect of speech coders on speech recognition performance", Proc. ICSLP 1996.

It is also known that the coder can extract speech recognition features from the acoustic signal and transmit those instead of the filter parameters. These features can then be used directly in the speech recognizer reducing losses due to acoustic signal coding and decoding. This technique is known as distributed speech recognition (DSR), where the speech recognition task is shared between the transmitter and the receiver.

With DSR, the transmitter must include another, specialized codec that extracts the speech recognition features. In addition, protocols must be established to distinguish regular codec parameters from speech recognition features. That necessitates the establishment of universal standards for such codecs and protocols in order for any cell phone or PDA to be able to communicate with any speech recognition server. Standards bodies such as the European Telecommunication Standards Institute (ETSI) and the International Telecommunication Union (ITU) are currently in the process of defining such standards.

There are problems with standardizing speech recognition features. First, the standards must be designed to accommodate the standards of wireless telephony, which are increasing fast, and many different standards are in use in different countries. Second, equipment manufacturers and the telephony service providers must be convinced to make appropriate product adjustments to conform to these standards.

However, the requirements could be simplified if the devices could continue to simply transmit coded speech parameters, but if recognition features could be derived directly from these. This would eliminate losses incurred due to further reconstruction of speech from the coded parameters. This would also eliminate the need for the transmitting device to incorporate another, specialized codec. This alternative approach to DSR, where the recognition features are determined directly from the codec parameters transmitted by standard codec, has been described by Choi et al. "Speech recognition method using quantized LSP parameters in CELP-type coders", Electron. Lett., Vol 34, no. 2, pp. 156–157, Jan. 1998, Gallardo-Antolin et al., "Recognition from GSM digital signal," Proc. ICSLP, 1998, Huerta et al., "Speech Recognition from GSM codec parameters," Proc. ICSLP, 1998, and Kim et al. "Bitstream-based feature extraction for wireless speech recognition," Proc. ICASSP 2000.

However, in these methods, a combination of recognition derived from short-term and long-term components of the bitstreams were obtained either through exhaustive experimentation or heuristically. In general, the performance achieved, while superior to that obtained with decoded speech, was inferior to that obtained with uncoded speech.

WI-007 Codec Standard

The WI-007 standard specifies a front-end for codecs in cellular telephones and other communication devices that connect to speech recognition servers, see "Distributed Speech Recognition; Front-end feature extraction algorithm; Compression algorithms," European Telecommunications Standards Institute, Document ETSI ES201 108 V1.1.2, April 2000.

FIG. 1 shows a block diagram of the WI007 front-end 100. Input speech 101, e.g., sampled 110 at 8 K Hz, is first subjected to DC offset removal 120 using a notch filter. The signal is windowed 130 into frames of 25 ms in length, with adjacent frames overlapping by 15 ms. The frames are pre-emphasized 140 and smoothed using a Hamming window 150, then subjected to a fast Fourier transform (FFT) 160. Thirty-two Mel-frequency spectral terms 170 covering the frequency range 64 Hz-4000 Hz are derived from them. The logarithm of the Mel frequency spectra are passed through a discrete cosine transform 180 to derive 13-dimensional Mel-frequency cepstral coefficients. The cepstral vectors thus obtained are further compressed for transmission on line 109. Beginning with the second cepstral component, pairs of cepstral components are vector quantized using code-books with 64 components.

The first component of the cepstral vectors is paired with the log energy 190 of the frame, and the pair is quantized using a 256 component codebook. The transmitted features have a bit rate of 4800 bits per second.

Coding Schemes

As shown in FIG. 2, standard codecs generally use linear predictive coding (LPC). In LPC-based codecs, frames of speech 201, typically between 20 ms and 30 ms long, are decomposed into LPC filter parameters 210, and an excitation signal, called a residual signal 220. The LPC filter parameters and the residual signal are further coded 230 and transmitted as a formatted bitstream 209. The primary difference between various LPC coding schemes is in the manner in which the residual signal is coded, although the schemes also vary in the size of the window, the order of LPC performed, and the manner in which the filter parameters are coded. Below, three codes are specifically considered: GSM, CELP, and LPC.

The GSM Full Rate Codec

The GSM codec is a linear predictive coder that uses regular pulse excitation, long-term prediction (RPE-LTP) to encode the speech signal. The GSM codec encodes 160-sample (20 ms) frames of preprocessed, 13-bit PCM speech, sampled at a rate of 8 K Hz, into RPE-LTP quantized parameters using 260 bits, resulting in an overall bit rate of 13 kilobits per second. Preprocessing is done on a per-frame basis. Each frame is first subjected to a DC offset compensation filter and then to a first order FIR pre-emphasis filter with a reemphasis factor of $2810/2^{15}$. LPC analysis is performed on each frame, and $8^{th}$ order LPC reflection coefficients are derived. The reflection coefficients are transformed to log area ratios, and quantized for transmission. A long-term prediction filter, characterized by a long-term gain and a delay, is derived four times in each frame, using sub-frames of 40 samples (5 ms) each, from the residual signal 220. The residual signal of the long-term prediction filter within each sub-frame is then represented by one of four candidate sequences of thirteen samples each. The quantized log area ratios, the long-term delay and gain, and the coded long-term residuals signal are all transmitted in the GSM bitstream 209.

The CELP FS1016 Codec

The CELP FS1016 codec is a linear predictive coder that uses codebook excited linear prediction to encode the speech signal. The CELP codec encodes 240-samples (30 ms) frames of 8 K Hz sampled speech into 144 bits of CELP coded parameters, resulting in an overall bit rate of 4800 bits per second. Each 240-sample frame of incoming speech is band-pass filtered between 100 Hz and 3600 Hz and $10^{th}$ order LPC analysis is performed. The derived LPC coefficients are converted to line spectral frequency (LSF) parameters that are quantized for transmission. The analysis window is further divided into four sub-frames of sixty samples (7.5 ms). Within each sub-frame, the LPC residual signal is represented as the sum of scaled codeword entries, one from a fixed codebook, and a second from an adaptive codebook that is constructed from the residual signal using information about the pitch. The fixed codebook entry is determined using an analysis-by-synthesis approach that minimizes the perceptually weighted error between the original speech signal and the re-synthesized signal. The LSF parameters, the codebook indices and gains, and pitch and gain information required by the adaptive codeword are transmitted.

The DOD LPC FS1015 Codec

The FS1015 codec encodes 180-sample (22.5 ms) frames of 8 K Hz sampled speech into fifty-four bits of LPC filter parameters, resulting in an overall bit rate of 2400 bits per second. Each 180 sample (22.5 ms) frame of incoming speech is pre-emphasized and a $10^{th}$ order LPC analysis is performed. LPC filter parameters are transformed to log area ratios for transmission. The residual signal is modeled either by white noise or by a periodic sequence of pulses, depending on whether the speech frame is identified as being unvoiced or voiced. The log area ratios, the voiced/unvoiced flag, the pitch, and the gain of the LPC filter are transmitted.

In the prior art, a number of techniques are known for deriving speech recognition features directly from encoded bit-streams. Those techniques have either concentrated on deriving spectral information from the LPC filter parameters, and, extracting only energy related information from the residual signal, see Choi et al., and Gallardo-Antolin et al., or have depended on empirically determined combination of the LPC filter parameters and the residual signal, see Huerta et al. and Kim et al.

Therefore, there is a need for a method that can extract speech recognition features directly from an encoded bitstream that correctly considers short and long term characteristics of the speech.

SUMMARY OF THE INVENTION

The invention provides a method for extracting speech recognition features from an encoded bitstream. The bitstream is first decoded to produce linear predictive coding filter parameters and a residual signal. The parameters and residual signal are then optimally combination in a discriminatory manner to construct the features necessary for speech recognition. The invention can directly be applied to different coding schemes, such as, GSM, CELP and LPC. For these schemes, the features extracted by the invention results in better recognition accuracies than those obtained with the decoded or reconstructed speech. But also, in the case of medium and high bit rate codecs like GSM and CELP, the result in recognition accuracies comparable with those obtained with uncoded speech.

More particularly, a method extracts speech recognition features from a speech signal coded as a bitstream. First, the bitstream is decoded to recover linear predictive coding filter parameters, and a residual signal. then, the linear predictive coding filter parameters and the residual signal are discriminatively combined into speech recognition features.

DETAILED DESCRIPTION OF THE PREFERRED EMBODIMENT

Figure 1:
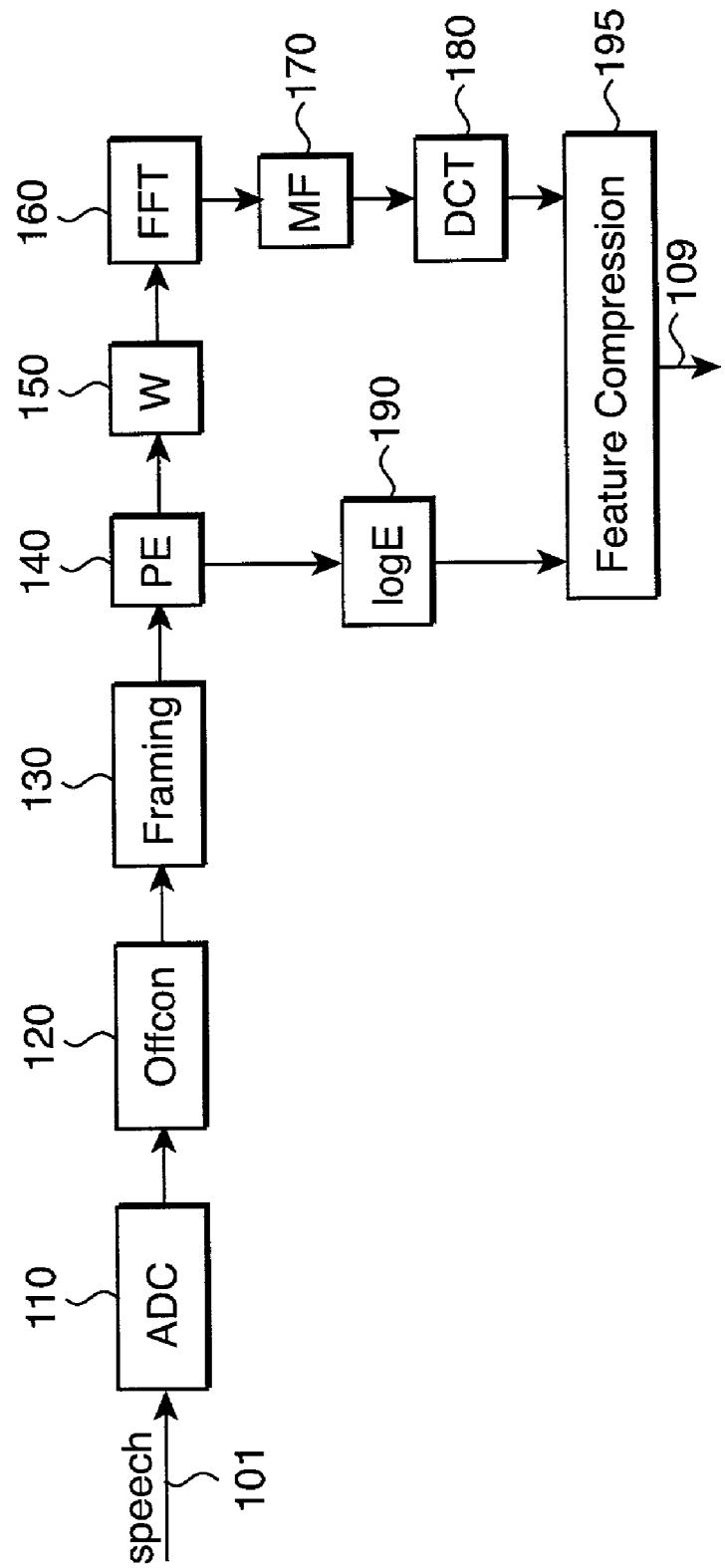
FIG. 1 is a block diagram of a prior art standard speech encoding front-end for a codec.
Figure 2:
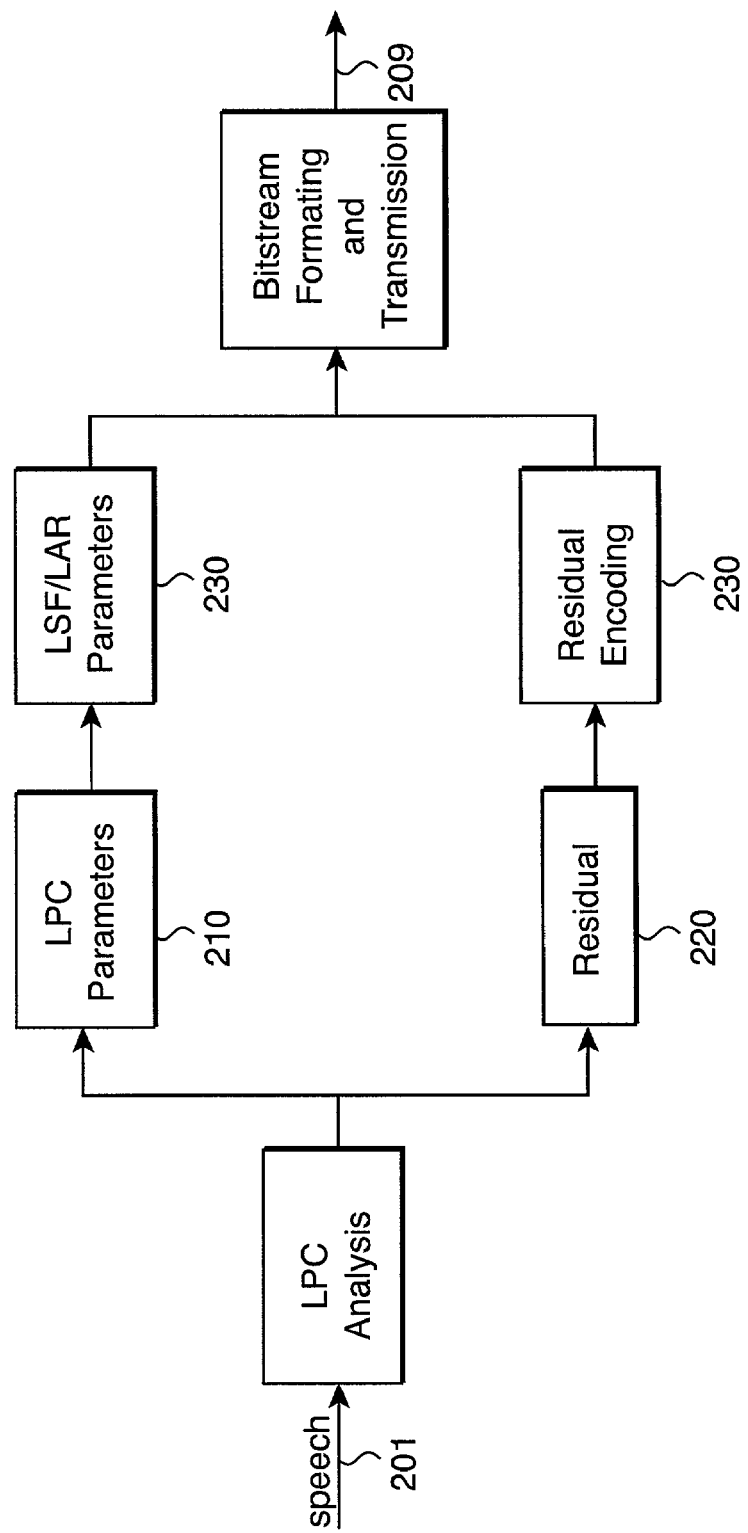
FIG. 2 is a flow diagram of prior art linear predictive coding.
Figure 3:
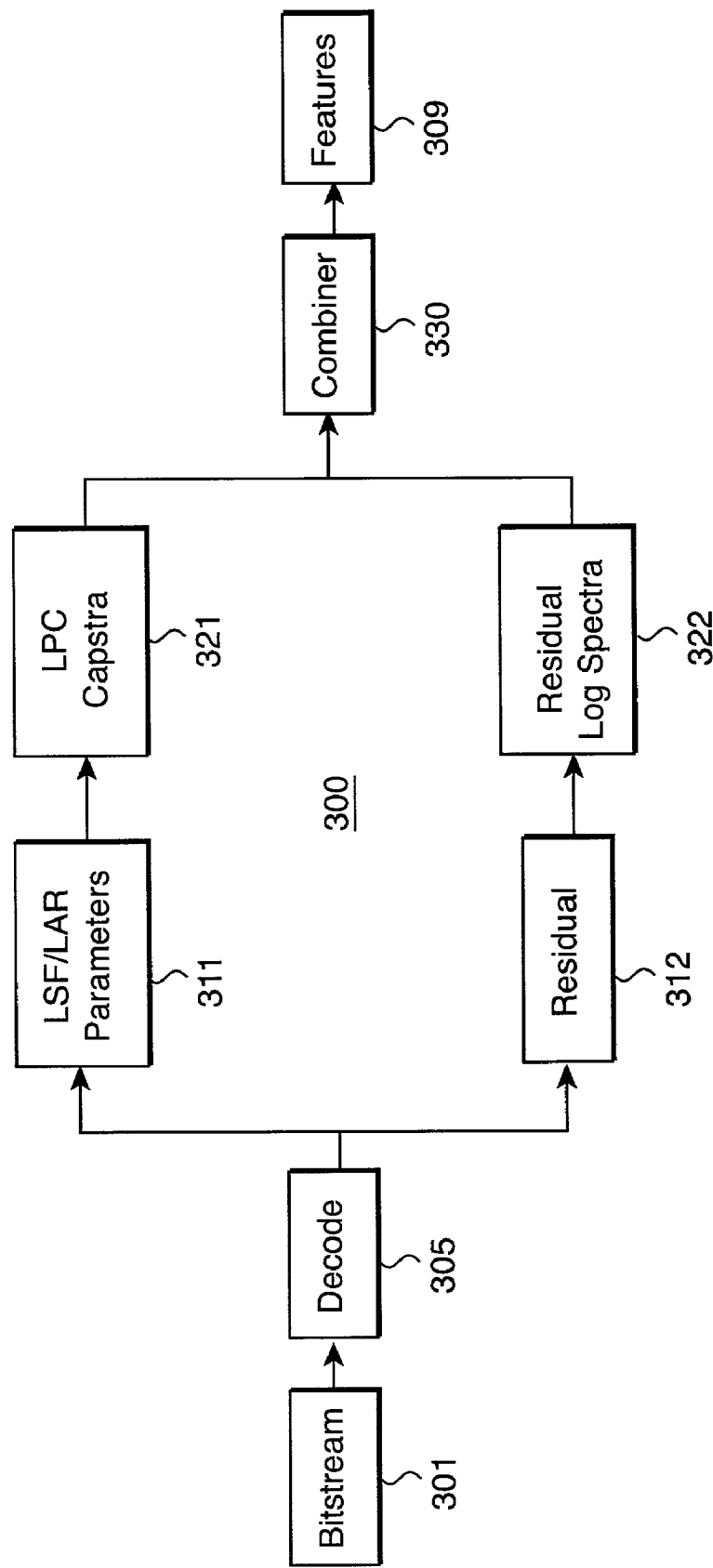
FIG. 3 is a flow diagram of a method for extracting speech recognition features from an encoded speech signal according to the invention.

FIG. 3 is a flow diagram of a method 300 according to our invention for directly extracting speech recognition features 309 from an encoded bitstream 301 using a decoder 305. The bitstream is encoded, as shown in FIG. 2, using linear predictive coding (LPC) techniques. Therefore, the LPC filter parameters 311 and a residual signal 312 can be recovered by the decoder. The speech recognition features according to our invention are derived directly from both these components of the bitstreams 301.

The LPC filter parameters 311 represent the short-term spectral characteristics of input the speech signal to a codec. These are usually the most important characteristics needed for recognizing speech. The residual signal 312, on the other hand, typically captures long-term information relating to the speaker, such as the pitch, and the perceptual quality of the reconstructed signal. In other words, the residual signal contains information characterizing the underlying speech sounds, and it is important to capture these characteristics in the features 309 as well.

The invention performs a discriminant analysis combining 330 of information from the LPC filter parameters 311 and the residual signal 312 a principled manner to optimize performance of a speech recognizer. First, the invention extracts LPC filter parameters 311 from the bitstream, e.g., LAR parameters for GSM, LPC or LSF parameters for CELP, and LSF for MELP using the decoder 305. The extracted parameters are up-sampled and interpolated to effectively obtain one set of LPC parameters every 10 ms of the bitstream. Cepstral vectors 321 are derived from the up-sampled LPC parameters.

The residual signal 312 is also extracted from the bitstream 301 by setting short-term prediction coefficients to zero, and decoding 305 the bitstream 301. Because it is unclear as to exactly which components of the residual signal contain information about the underlying speech, the entire spectrum of the residual signal is analyzed for useful components. We derive 32-dimensional log spectra 322 are from the residual signal of each frame corresponding to an LPC vector in the interpolated sequence of LPC vectors.

The extended vector is formed by concatenating every LPC cepstral vector 321 with the corresponding log-spectral components 322 from the residual signal, for every frame. The dimensionality of the vectors is then reduced to thirteen by performing Fisher's linear discriminant analysis (LDA) on the on the extended vectors, see Duda et al., "*Pattern Classification*," John Wiley and Sons Inc., New York, N.Y., 2001. The classes that are used for the LDA 330 are the same as the phones modeled by the recognizer. Linear discrimination analysis maximally separates the classes.

In an alternative embodiment, the dimensionality reduction can be performed using a discriminatory neural network. Neural networks are generally able to modify themselves during use to favor certain desired connection paths over others. Neural networks are used in a variety of applications such as pattern recognition and data classification due to their ability to be trained and thereby learn. A feedforward neural network includes output nodes and a set of hidden nodes having associated weights.

When used for discriminative analysis according to the invention, the neural network has four layers of neurons, where the second layer has only as many neurons as the number of discriminant features desired. The weights of the network are learned in a training phase. The training data are cepstral and log-spectral features derived from the LPC parameters and the residual signal of the codec bitstream. The weights of the neural network are optimized to maximize the ability of the network to distinguish between various sound units. The final discriminant neural network consists of only the first and second layers of the trained network, the third and fourth layers are discarded.

During speech recognition, the cepstral and log-spectral features from the LPC and residual components of the bitstream are input to the final two-layer network and the output of the second layer are used for recognition, see Fontaine et al., "*Nonlinear Discriminant analysis for improved speech recognition*," Proc. EUROSPEECH '97, 1997 for a description of a speech recognition technique that can be used.

In another embodiment, a three-layer neural network is trained discriminatively with the LPC cepstra and residual Log-spectra as inputs. The output of the three-layer network are use as features the speech recognizer, Ellis et al., "*Tandem acoustic modeling in large-vocabulary recognition*," Proc. ICASSP-2001, May, 2001.

Codec Applications

Specifically, for the GSM codec, the 13-dimensional cepstral coefficients are derived from the $8^{th}$ order LPC parameters. Every cepstral vector represented 20 ms of speech, maintaining synchronicity with the coded bitstream 301.

For the CELP codec, the 15-dimensional cepstral coefficients are derived from the $10^{th}$ order LPC parameters in the bitstream. Although the transmitted coefficients represent 30 ms of speech, they are up-sampled using linear interpolation to represent only 25 ms of speech.

For the LPC codec, the 15 dimensional cepstral coefficients are derived from the $10^{th}$ order LPC parameters in the bitstream. Each cepstral vector now represents 22.5 ms of speech.

For other codecs, such as MELP, a similar interpolation can be done to obtain LPC ceptras for windows between 20 and 25 ms. It should be understood that the invention can be applied for any codec that encodes speech as LPC parameters and a residual signal.

EFFECT OF THE INVENTION

The invention derives optimal speech recognition features from an encoded bitstream in the case of GSM, LPC and CELP codecs. With our invention, it is possible to obtain recognition performance that is comparable with, if not better than, that obtained with uncoded speech using features derived directly from the bitstreams of these codecs. Thus, the invention enables the design of a distributed speech recognition system where feature extraction need not be performed on a user's handheld device. This reduces the immediate to change existing coding and transmission standards in telephone networks. It should also be understood, the invention makes the type of codec used transparent to the speech recognizer, which is not the case when the features are extracted from a reconstructed bitstream.

However, the invention can also be used in a front-end to a codec. Such a front-end codec can parameterize full-bandwidth speech sampled at bit rates greater than 8000 Hz. This results in much greater recognition accuracies. Bitstream-based feature representations provide an intermediate route where much better recognition accuracies are obtained than with decoded speech using traditional communications devices that do not incorporate the front-end codecs or the transmission protocols that go with them. The method according to the invention furthers this end by presenting an automated mechanism extracting speech recognition features from encoded bitstreams.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for extracting speech recognition features from a speech signal coded as a bitstream, comprising:
   decoding the bitstream to recover linear predictive coding filter parameters;
   decoding the bitstream to recover a residual signal;
   concatenating the linear predictive coding filter parameters and the residual signal into an extended vector; and
   reducing a dimensionality of the extended vector to extract speech recognition features from the bitstream.

2. The method of claim 1 further comprising:
up-sampling the linear predictive coding filter parameters; and
interpolating the up-sampled linear predictive coding filter parameters.

3. The method of claim 2 wherein a set of samples is obtained for every frame of the bitstream.

4. The method of claim 2 further comprising:
deriving cepstral vectors from the up-sampled linear predictive coding filter parameters.

5. The method of claim 1 further comprising:
setting short-term prediction coefficients to zero; and
decoding the bitstream to obtain the residual signal.

6. The method of claim 1 further comprising:
analyzing an entire spectrum of the residual signal.

7. The method of claim 1 further comprising:
deriving a high-dimensional log spectra from the residual signal for each set of up-sampled linear predictive coding filter parameters.

8. The method of claim 1 further comprising:
deriving a cepstral vector corresponding to each set of linear predictive coding filter parameters of each frame;
deriving a high-dimensional log spectra from the residual signal for each frame;
concatenating the cepstral vector with each corresponding high-dimensional log spectra for each frame to generated the extended vector.

9. The method of claim 8 further comprising:
reducing the dimensionality of the extended vector using linear discriminant analysis.

10. The method of claim 8 further comprising:
reducing a dimensionality of the extended vector using discriminant neural network.

11. The method of claim 1 wherein the speech recognition features are extracted from a bitstream in a server executing a speech recognizer.

* * * * *